(12) United States Patent
Greenstein et al.

(10) Patent No.: US 11,164,587 B2
(45) Date of Patent: Nov. 2, 2021

(54) TRIAL AND ERROR BASED LEARNING FOR IOT PERSONAL ASSISTANT DEVICE

(71) Applicant: INTERNATIONAL BUSINESS MACHINES CORPORATION, Armonk, NY (US)

(72) Inventors: Bret A. Greenstein, Danbury, CT (US); Lisa Seacat DeLuca, Baltimore, MD (US); Amit Fisher, San Jose, CA (US); Steven R. Abrams, New City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/247,864

(22) Filed: Jan. 15, 2019

(65) Prior Publication Data

US 2020/0227050 A1    Jul. 16, 2020

(51) Int. Cl.
| | | |
|---|---|---|
| *G10L 17/04* | (2013.01) | |
| *G10L 15/06* | (2013.01) | |
| *H04L 12/28* | (2006.01) | |

(52) U.S. Cl.
CPC ............ *G10L 17/04* (2013.01); *G10L 15/063* (2013.01); *H04L 12/282* (2013.01); *G10L 2015/0638* (2013.01); *H04L 2012/285* (2013.01)

(58) Field of Classification Search
CPC ..... H01L 2924/00; H01L 2924/00012; H04W 4/80; H04W 4/70; H04W 12/06; H04W 84/12; H04W 12/04; H04N 5/2256; H04N 5/2252; H04N 5/247; H04N 7/183; H04L 67/12; H04L 63/0428; H04L 63/0876;
(Continued)

(56) References Cited

U.S. PATENT DOCUMENTS

| | | | |
|---|---|---|---|
| 2003/0167167 A1* | 9/2003 | Gong | ............... G10L 15/22 704/250 |
| 2008/0165202 A1* | 7/2008 | Brodersen | ........ H04N 21/44222 345/581 |

(Continued)

OTHER PUBLICATIONS

Atilla Guzel, Popularity of Data Science, Python and Python's Major Libraries, May 23, 2018, Linkedin (Year: 2018).*
(Continued)

*Primary Examiner* — Chris Parry
*Assistant Examiner* — Abderrahmen Chouat
(74) *Attorney, Agent, or Firm* — Daniel Yeates; Andrew D. Wright; Roberts Calderon Safran & Cole, P.C.

(57) ABSTRACT

A personal assistant operation is provided for teaching a personal assistant device names preferred by the user for sensor activated devices. For this purpose, a method includes the personal assistant device receiving a request from a user to activate a requested device which the user has identified with a requested name which is unrecognized by the personal assistant device, determining a most likely candidate device from a list of candidate devices to activate in response to the request, activating the determined most likely candidate device, and identifying and saving the requested name as the name of the most likely candidate device in response to receiving confirmation from the user that the determined most likely candidate device is the requested device.

20 Claims, 6 Drawing Sheets

(58) Field of Classification Search
CPC ......... H04L 67/10; H04L 9/085; G02B 5/021; G02B 5/0215; G02B 5/0226; G02B 5/0231; G02B 5/0242; G02B 5/0278; G02B 5/045; G02B 6/0031; G02B 6/0038; G02B 6/0041; G02B 6/0043; G02B 6/0046; G02B 6/005; G02B 6/0051; G02B 6/0053; G02B 6/0055; G02B 6/0071

See application file for complete search history.

(56) References Cited

U.S. PATENT DOCUMENTS

| | | | |
|---|---|---|---|
| 2009/0222592 A1* | 9/2009 | Anderson | H04N 1/32545 710/8 |
| 2009/0239587 A1* | 9/2009 | Negron | G08C 17/02 455/566 |
| 2012/0159597 A1* | 6/2012 | Thomas | G06F 21/00 726/7 |
| 2016/0036764 A1 | 2/2016 | Dong et al. | |
| 2016/0366123 A1 | 12/2016 | Smith et al. | |
| 2017/0288965 A1 | 10/2017 | Cebere | |
| 2018/0190264 A1* | 7/2018 | Mixter | G06F 3/167 |
| 2019/0180770 A1* | 6/2019 | Kothari | G06N 20/00 |
| 2019/0295544 A1* | 9/2019 | Garcia | G06F 40/30 |
| 2020/0106632 A1* | 4/2020 | Lewis | G06T 7/74 |

OTHER PUBLICATIONS

Sobia Arshad et al., "Towards Information-Centric Networking (ICN) Naming for Internet of Things (IoT): The Case of Smart Campus," In Proceedings of ICFNDS '17, Jul. 19-20, 2017, 6 pages.
Jiansong Zhang et al., "Proximity based IoT device authentication," IEEE INFOCOM 2017—IEEE Conference on Computer Communications, pp. 9.
Yating Yang et al., "Local naming service for named data networking of things," Proceedings of ICN '17, Sep. 26-28, 2017, pp. 2.
Ulfat Imdad et al., "Auto Configuration Based Enhanced and Secure Domain Naming Service for IPV-6 Internet of Things," Proceedings of ICFNDS 17, Jul. 19-20, 2017, pp. 5.
Jordi Mongay Batalla et al., "Conception of ID layer performance at the network level for Internet of Things," Personal and Ubiquitous Computing, Apr. 28, 2013, vol. 18, pp. 16.
Mell et al., "The NIST Definition of Cloud Computing", NIST, Special Publication 800-145, Sep. 2011, 7 pages.

* cited by examiner

TRIAL AND ERROR BASED LEARNING FOR IOT PERSONAL ASSISTANT DEVICE

BACKGROUND

The present invention generally relates to personal assistant devices, and, more particularly, teaching personal assistant devices names preferred by the user for sensor activated devices connected to the personal assistant device.

Personal assistant devices are gaining popularity in making it easier for consumers to interact with sensor activated devices in their homes and businesses. Such personal assistant devices are often referred to as IoT (Internet of Things) personal assistant devices inasmuch as they make use of a cloud computing environment for carrying out their functions in turning sensor activated devices connected to the personal assistant devices on and off, and performing other functions the devices are capable of. For this purpose, it is necessary for the personal assistant device to recognize names of the devices provided by the user so that the correct connected device can be activated or deactivated in response to the user's request.

SUMMARY

In a first aspect of the invention, there is a method comprising: receiving, by a personal assistant device, a request from a user to activate a requested device which the user has identified with a requested name which is unrecognized by the personal assistant device; determining, by the personal assistant device, a most likely candidate device from a list of candidate devices to activate in response to the request; activating, by the personal assistant device, the determined most likely candidate device; determining if confirmation is received from the user that the determined most likely candidate device is the requested device; and identifying and saving, by the personal assistant device, the requested name as the name of the most likely candidate device in response to receiving confirmation from the user that the determined most likely candidate device is the requested device.

In another aspect of the invention, there is a system comprising: a processor, a computer readable memory, and a computer readable storage medium located in a personal assistant device; program instructions to receive a request from a user, by a personal assistant device, to activate a requested device which the user has identified with a requested name which is unrecognized by the personal assistant device; program instructions to determine, by the personal assistant device, a most likely candidate device from a list of candidate devices to activate in response to the request; program instructions to activate, by the personal assistant device, the determined most likely candidate device; program instructions to determine, by the personal assistant device, a next most likely candidate device from the list of candidate devices to activate in response to the request, based on cognitive analysis of data regarding the candidate devices on the list, in response to receiving an indication from the user that the determined most likely candidate device on the list is not the requested device; program instructions to activate, by the personal assistant device, the determined next most likely candidate device; program instructions to receive confirmation from the user that the determined next most likely candidate device is the requested device; and program instructions to identify and save, by the personal assistant device, the requested name as the name of the next most likely candidate device in response to receiving confirmation from the user that the determined next most likely candidate device is the requested device.

In another aspect of the invention, there is computer program product, comprising a computer readable storage medium having program instructions embodied therewith, the program instructions executable by a personal assistant device to cause the computing device to: receive a request from a user to activate a requested device which the user has identified with a requested name which is unrecognized by the personal assistant device; determine a most likely candidate device from a list of candidate devices to activate in response to the request; activate the determined most likely candidate device; receive confirmation from the user that the determined most likely candidate device is the requested device; and identify and save the requested name as the name of the most likely candidate device in response to receiving confirmation from the user that the determined most likely candidate device is the requested device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
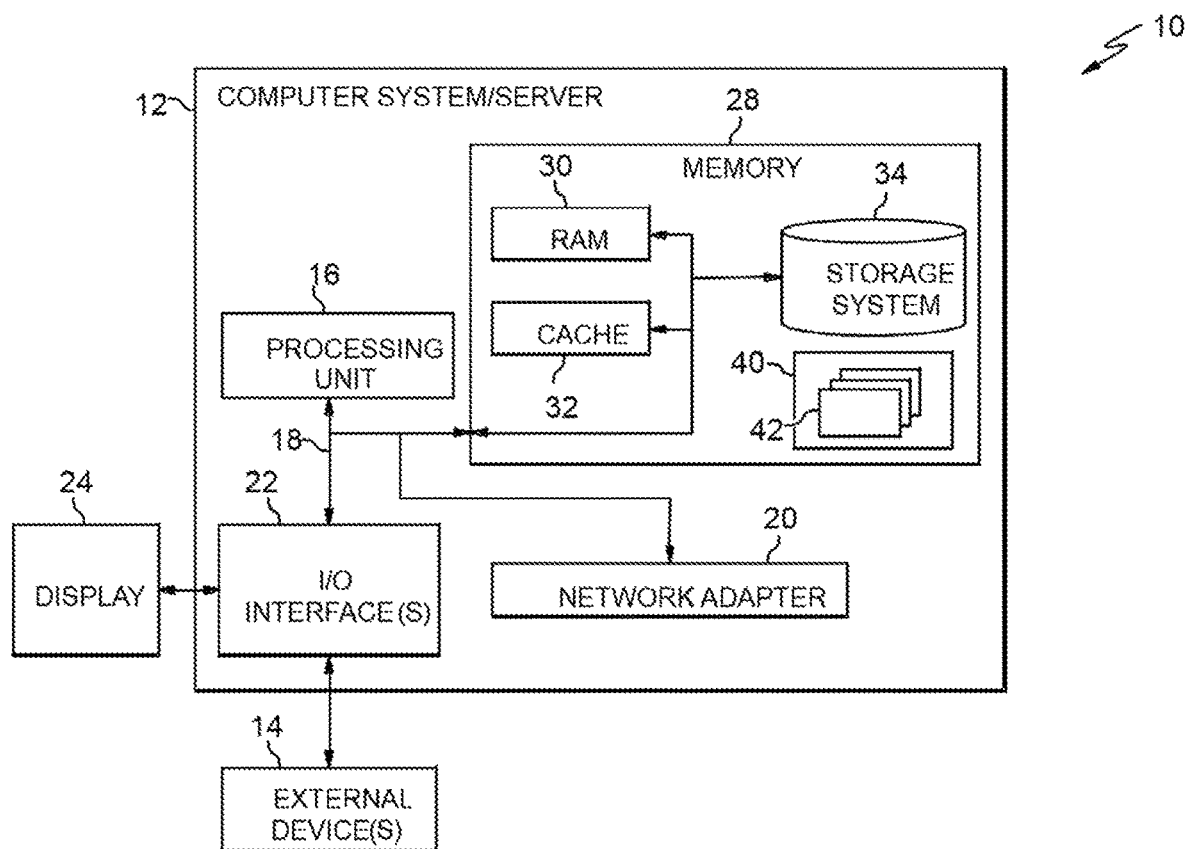
FIG. 1 depicts a cloud computing node according to an embodiment of the present invention.

The present invention generally relates to personal assistant devices, and, more particularly, teaching personal assistant devices names preferred by the user for sensor activated devices connected to the personal assistant device. Typically, in smart homes and automation, devices, such as lighting devices, electronic equipment, and appliances, can pair with sensors which are connected wirelessly to the personal assistant device to allow users to use their voice to enable the sensor and thereby activate or deactivate the device. For example, a user might tell their personal assistant device to turn on a light or to arm a security system. One problem with current personal assistant devices is that they rely on the user to manually configure each sensor connected to a device to teach the personal assistant device which sensor activated device is associated with each term which the user uses to identify each device. For example, each user gives each sensor a new name in order for the personal assistant device to recognize the sensor and, correspondingly, activate or deactivate the intended device requested by the user. This is time consuming, and difficult for the user.

For example, in a typical conventional personal assistant device arrangement, and exemplary instruction to the personal assistant device would be "turn on the living room lamp." If they device name is unknown to the personal assistant device, it will reply back with a message such as "Sorry, I didn't find living room lamp." In this case, in a typical conventional personal assistant device arrangement the user will then need to perform a manual naming operation to identify the particular sensor activated living room lamp which the user intended to activate with the request "turn on the living room lamp." This can be confusing for users who are unfamiliar with such programming. In particular, the user may have to open a special app, other than the app associated with the personal assistant device, in order to perform the naming operation.

Aspects of the present invention include using an automated trial and error approach to activate/deactivate the correct device in response to a user's request, and to associate the name requested by the user with the correct device for future use. In accordance with aspects of the invention, in response to receiving a request from a user to activate a device which the user has identified with a first name, the personal assistant device reviews a list of existing devices which are wirelessly attached to the personal assistant device to determine whether a device with the requested name is on the list. In response to determining that the device with the requested name is not on the list, the personal assistant device reviews data regarding the devices on the list and determines, based on the data, a first one of the devices on the list as a "best guess" device to activate in response to the request. The personal assistant device then attempts to activate the determined device. In response to receiving confirmation from the user that the determined first one of the devices on the list is the correct device, the personal assistant device will save the first name as a confirmed name for the determined first one of the devices. On the other hand, if the activated device is not the correct device, the personal assistant device turns off the device and again reviews the data and make a best guess as to a second one of the devices on the list to activate in response to the request.

Advantageously, embodiments of the present invention provide technical solutions to the problem of teaching personal assistant devices names preferred by users for sensor activated devices connected to the personal assistant device. In implementations, the system performs an unconventional operation of reviewing, by a personal assistant device, a list of sensor activated physical devices which the personal assistant device is connected to determine whether a particular one of the devices with a name specified by the user is on the list, and, if there are no devices on the list with the specified name, determining and activating one of the devices on the list based upon stored data regarding a characteristics of the sensor activated devices. Aspects of the invention are implemented using devices and techniques that are necessarily rooted in computer technology, such as computer-based cognitive analysis and classification, that have no pre-computer analog. Further, aspects of the invention are implemented with particular physical sensors connected or built into the activated physical devices, and by using wireless communication between the personal assistant device and the sensors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
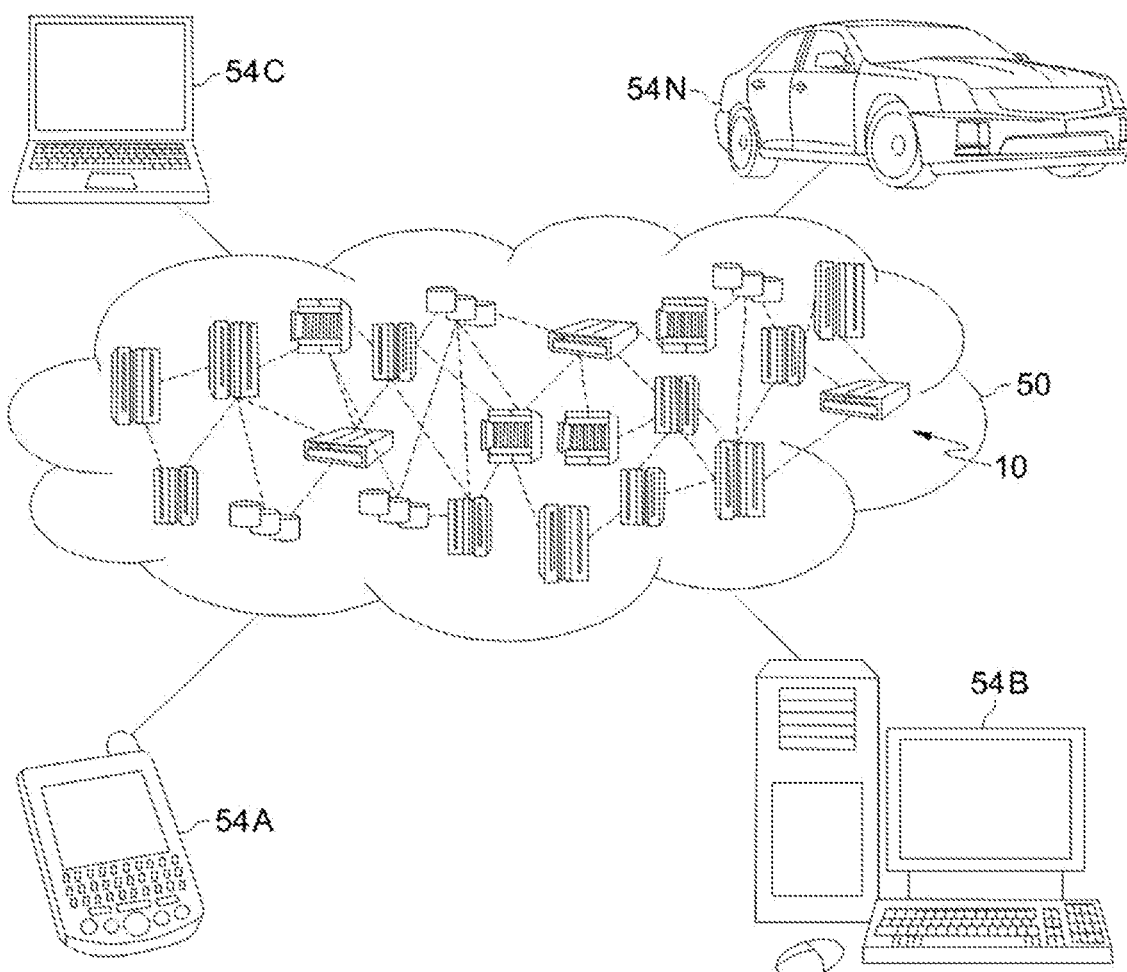
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
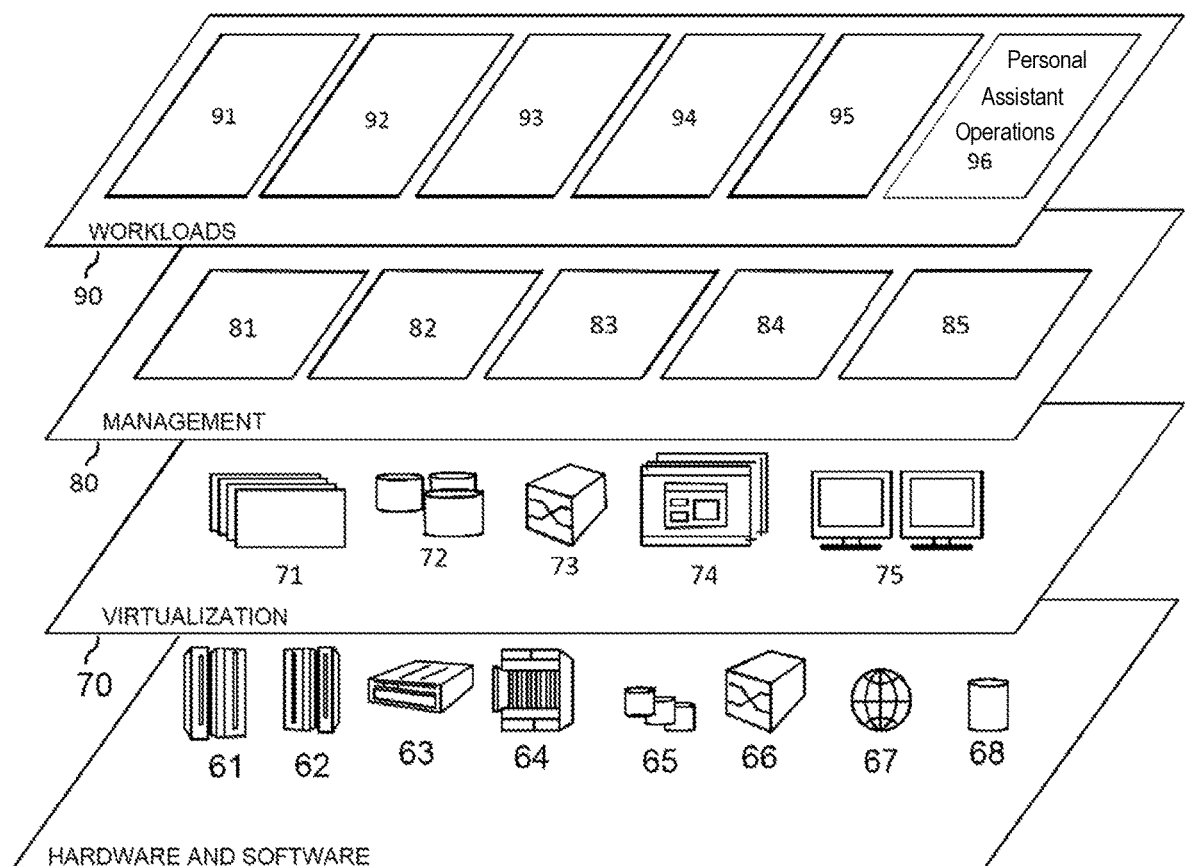
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal assistant operations 96.

Figure 4:
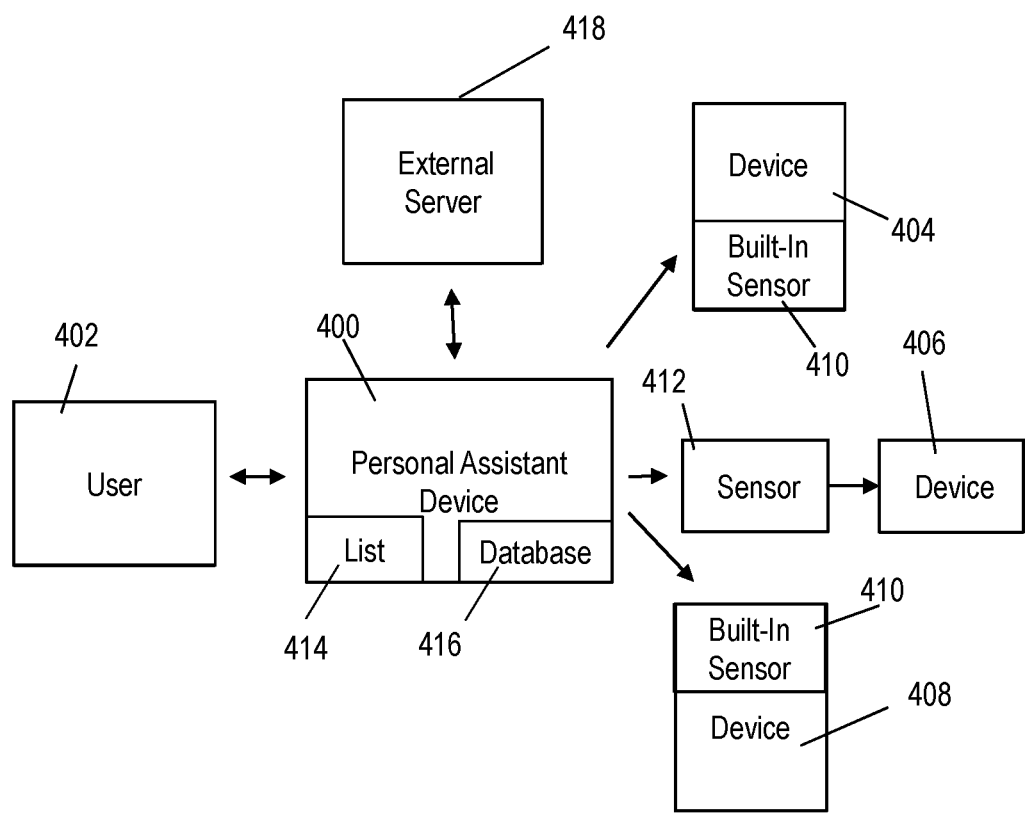
FIG. 4 shows a block diagram of an exemplary embodiment in accordance with aspects of the invention.

FIG. 4 shows a block diagram of an exemplary embodiment in accordance with aspects of the invention. In this embodiment the personal assistant operations 96 shown in FIG. 3 are implemented by a personal assistant device 400 which is provided for a user 402, and which serves as a control device between the user 402 and a plurality of IoT sensor activated devices, shown, for example, as devices 404, 406 and 408, although any number of devices can be connected to the personal assistant device 400. Each of the devices 404, 406 and 408 includes, or is connected to, a sensor for connecting it wirelessly to the personal assistant device 400. In embodiments, built in sensors 410 are used, for example, as shown for devices 404 and 408. In alternative embodiments, external sensors 412 are used to activate the devices, as shown for the device 406. In embodiments, the devices 404, 406 and 408 are, for example, electronic devices, such as televisions, audio equipment, security systems and computers, or electrical devices, such as lamps, or appliances, such as microwaves and coffee pots, etc.

In embodiments, the personal assistant device 400 is a computer device having one or more components of the computer system/server 12 shown in FIG. 1. In particular, the personal assistant device 400 includes one or more program modules 42 shown in FIG. 1 to implement the operations described below. In addition, according to aspects of the present invention, the personal assistant device 400 is designed to operate in a cloud computing environment, such as shown in FIG. 2, to connect to remote servers via a cloud computing environment 50.

In embodiments, the personal assistant device 400 includes a list 414 of the sensor activated devices, such as 404, 406 and 408, that it is wirelessly connected to, and a database 416 storing information about the devices on the list 414. Initially, each device on the list is identified with a number provided by the manufacturer, for example, a model number or a serial number. In order to be useful to the user 402, the list 414 identifies individual devices with unique names which the user 402 uses to identify specific devices which it is referring to. As noted above, conventionally the user provides these names manually by programming, generally using a different app than the app provided for the personal assistant device 400. In aspects of the present invention, the names for the individual devices provided on the list 414 are provided through an automated trial and error operation so that the user 402 does not need to manually program the names.

In order to provide the unique names, and to allow the personal assistant device 400 to make a best guess at the device requested by the user 402 using cognitive analysis and/or NLP, the database 416 stores data regarding the sensor activated devices connected to the personal assistant device 400, such as 404, 406 and 408. In embodiments, the database 416 stores data regarding location context. For example, if the user 402 asks to turn on the device while in the kitchen, the device is likely to also be located in the kitchen. In another example, when the user 402 asks to turn on the device with location qualifiers, such as "the kitchen light," the user 402 is therefore likely asking about one of the connected lightbulbs located in the kitchen. In alternative embodiments, the database 416 stores device type, for example, if the user asks about words such as "light" or "bulb" or "lamp," the user is likely asking about a connected lightbulb device. In an alternative embodiment, if the user 402 asks about words such as "temperature" or "heat" or "adjust the A/C," the user is likely asking about a connected thermostat. In other alternative embodiments, the database 416 stores data regarding sensor proximity. For example, if the user is standing near the request device, proximity technology is used to determine the location of the user in relationship with multiple devices to make a best guess at the device intended by the user 402. This is particularly useful in situations where a large number of devices are wirelessly connected to the personal assistant device 400.

In alternative embodiments utilizing cognitive analysis and/or NLP, the database 416 stores data regarding currently unnamed sensors. For example, if the user 402 asks about a "light in Bob's room," and there is only one device in Bob's room which has not been previously named, this information is stored in the form of an unmapped sensor. In still further embodiments, a collective opinion of a group of individuals rather than that of a single expert, often referred to as the "wisdom of the crowd" is stored in the database 416 for use in making a best guess regarding the most likely device that the user 402 requested. This collective opinion of a group represents a large group's aggregated answers to questions involving quantity estimation, general world knowledge, and spatial reasoning has generally been found to be as good as, but often superior to, the answer given by any of the individuals within the group. For example, if the user 402 asks to "turn on all lights" or "movie theme," the system uses similar heuristics that include crowd wisdom (e.g., 87% of all users include TV, speakers and lights in their movie night theme, or 34% include shades, or 27% include turning on particular programming, etc.) This is particularly useful in rendering an accurate best guess in cases where multiple sensor activated devices are part of a group that is to be used in response to the user's request.

As an exemplary environment of an automated trial and error interaction with the user 402 to name requested devices and store the name on the list 414 using the data stored in the database 416, assume the user 402 has a set of connected devices (i.e., IoT sensor activated devices connected to the personal assistant device), such as shown in FIG. 4 with the numeral 404, 406 and 408, which are each configured to be associated with the personal assistant device 400, but which have not yet been named by the user. A few of these devices 404, 406 and 408 are lightbulb devices, and they are respectively located in different rooms in the user's residence.

In embodiments, this confirmation is a direct message from the user 402 to the personal assistant device 400 that the correct device has been activated. In alternative embodiments, confirmation is accomplished based on the personal assistant device 400 not receiving any information from the user 402 over a predetermined time period following activation of the correct device. In other words, in this alternative embodiment, the lack of any further commands or comments from the user 402 is understood by the personal assistant device 400 to be confirmation that the correct device has been activated. In embodiments, the personal assistant device 400 provides a verbal response to the user 402 that the name has been stored to identify the particular sensor activated device in question.

In embodiments, the above described operations of the personal assistant device 400 in performing the trial and error analysis to associate the requested name with the correct sensor activated device, as well as the list 414 and the database 416, are provided in an external server 418, as shown in FIG. 4. In this case, the external server 418 is part of a cloud computing environment, such as shown in FIGS. 2 and 3. In alternative embodiments, these operations, as well as the list 414 and the database 416 are provided in the personal assistant device 400 itself, as shown in FIG. 4, located, for example in the users home or office.

Figure 5:
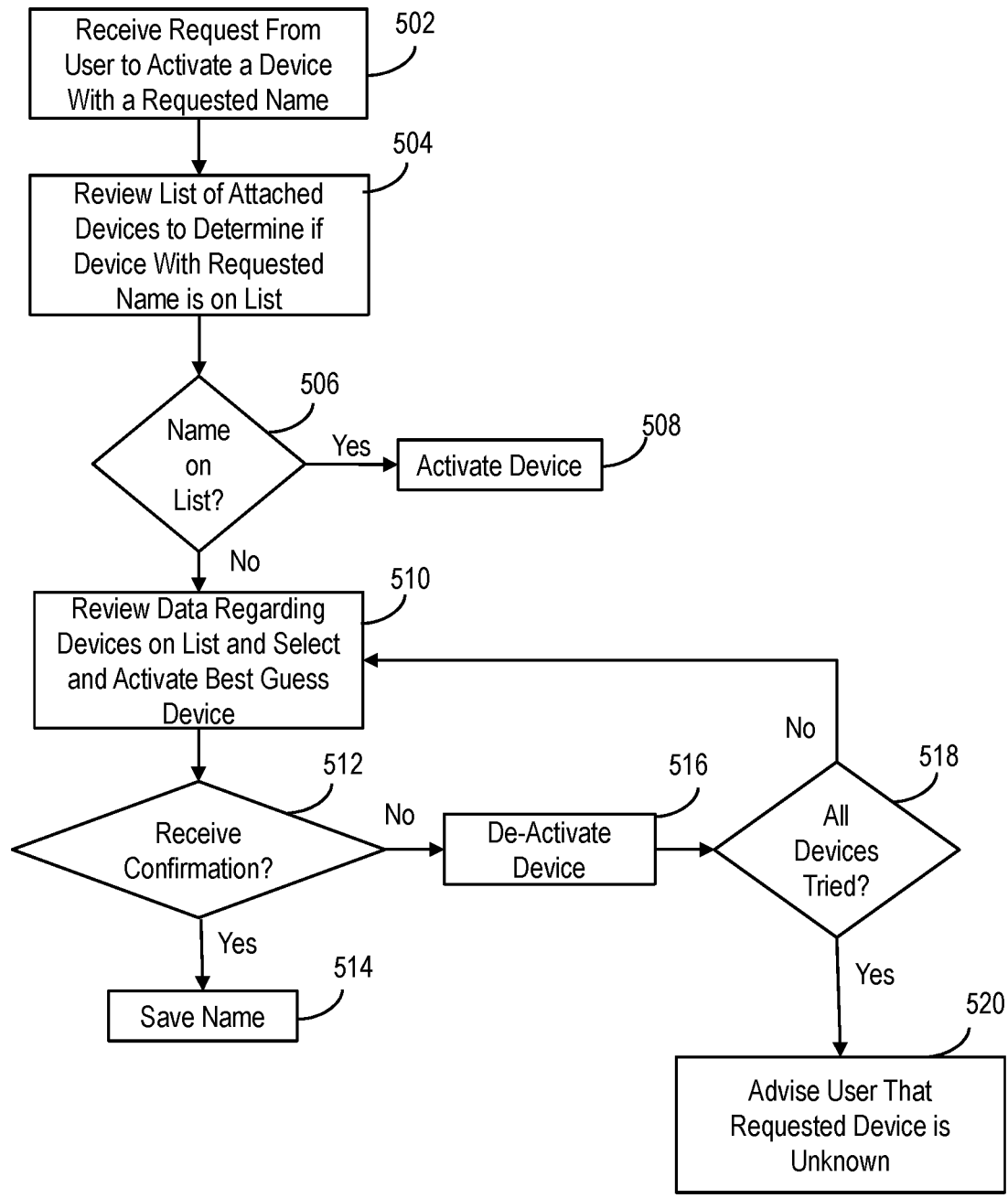
FIG. 5 shows a flowchart of an exemplary method in accordance with aspects of the invention.

FIG. 5 depicts a flowchart of an exemplary method in accordance with aspects of the invention. The steps of the method are performed in the environment of FIG. 4 and are described with reference to the elements and steps described with respect to FIGS. 2 and 3.

At step 502 of FIG. 5, the personal assistant device 400 receives a request from the user 402 to activate a device which the user 402 has identified with a requested name. At step 504, the personal assistant device 400 reviews the list 414 of devices, such as 404, 406 and 408, which the personal assistant device 400 is wirelessly attached to in order to determine whether a device with the requested name is on the list 414. At step 506, if the requested name is on the list 414, the personal assistant device activates the requested device at step 508. On the other hand, at step 506, if the requested name is not on the list, then at step 510, the personal assistant device 400 reviews the data stored in the database 416 regarding the devices, such as 404, 406 and 408, in order to make a best guess using cognitive analysis and/or NLP to determine and activate a best guess device based on the data regarding the devices stored in the database 416.

At step 512, the personal assistant device 400 determines whether confirmation is received from the user 402 that the correct device has been activated in step 510. In embodiments, this confirmation is a direct confirmation from the user 402, for example, a verbal confirmation that the correct device has been activated. In alternative embodiments, the confirmation is in the form of not receiving any information from the user 402 within a predetermined time period following activation of the determined device.

If confirmation that the correct device has been activated is received at step 512, the personal assistant device 400 stores the requested name used by the user 402 in making the request in the list 414 as the confirmed name for the particular determined device. On the other hand, if it is determined in step 512 that confirmation is not received from the user 402, the personal assistant device 400 deactivates the device in step 516. In step 518 the personal assistant device 400 determines whether all devices on the list 414 have been tried in response to the user's request. If all devices on the list 414 have been tried, then the personal assistant device 400 advises the user in step 520 that the requested device is unknown. In this case, the user 402 can proceed to provide a manual identification of the device in accordance with conventional naming procedures.

On the other hand, if it is determined in step 518 that there are still devices on the list 414 that are not yet been determined in response to the user's request, the personal assistant device 400 performs step 510 again to conduct a further review of the data in the database 416 regarding the remaining devices on the list 414 which have not yet been tried.

Figure 6:
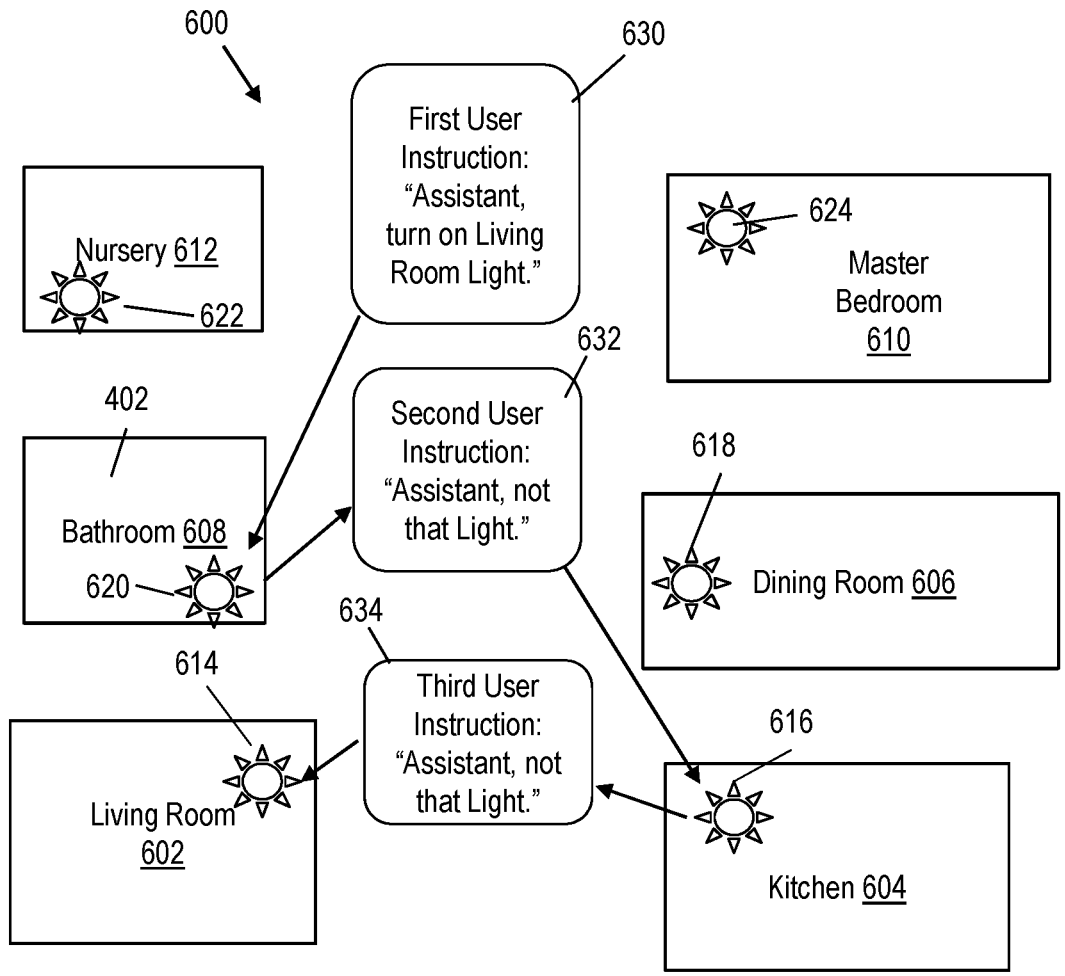
FIG. 6 shows a block diagram of an example of operation in an exemplary environment in accordance with aspects of the invention.

FIG. 6 shows an example of operation of the present invention in an exemplary environment. In the example, an apartment 600 is shown with a living room 602, a kitchen 604, a dining room 606, a bathroom 608, a master bedroom 610, and a nursery 612. Each of the rooms includes a light, such as a living room light 614 in the living room 602, a kitchen light 616 in the kitchen 604, a dining room light 618 in the dining room 606, a bathroom light 620 in the bathroom 608, a nursery light 622 in the nursery 612 and a bedroom light 624 in the master bedroom 610.

In an example of an operation of the invention in the exemplary embodiment of FIG. 6, assume the user 402 provides a first instruction 630 to "turn on the living room light." After reviewing the list 414, the personal assistant device 400 makes the determination that there is no device on the list currently named "living room light." Therefore, using the stored data on the data list 416 of FIG. 4, the personal assistant device 400 makes a best guess, using cognitive analysis and/or Natural Language Processing (NLP), as described below, that the light 620 in the bathroom 608 corresponds to the requested device, and activates the bathroom light 620. Seeing this, the user 402 advises the personal assistant device 400 in a second instruction 632 that the activated bathroom light 620 was not the correct light. Upon receiving this information, the personal assistant device 400 turns off the bathroom light 620 and repeats a review of the data in the database 416, and makes a second best guess, again using cognitive processing or NLP, as to which light was intended.

In this example, the second best guess results in the personal assistant device 400 activating a kitchen light 616 in the kitchen 604. In the example, again, the user 402 advises the personal assistant device 400 in a third instruction 634 that the activated device, i.e., the kitchen light 616, is not the correct device. In response, once again, the personal assistant device 400 turns off the kitchen light 616 and again reviews the data regarding the connected devices in the database 416 and determines the living room light 614 in the living room 602, which is the correct device. Upon receiving confirmation from the user 402 that the light 614 in the living room 602 is the "living room light," requested by the user 402, the personal assistant device 400 stores this name on the list to confirm it as the requested name preferred by the user 402 for the light 614 located in the living room 602.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  receiving, by a personal assistant device, a request from a user to activate a requested device which the user has identified with a requested name which is unrecognized by the personal assistant device;
  determining, by the personal assistant device, a most likely candidate device from a list of candidate devices, to activate in response to the request;
  activating, by the personal assistant device, the determined most likely candidate device;
  determining if confirmation is received from the user that the determined most likely candidate device is the requested device;
  identifying and saving, by the personal assistant device, the requested name as a name of the most likely candidate device in response to receiving the confirmation from the user that the determined most likely candidate device is the requested device; and
  deactivating, by the personal assistant device, the determined most likely candidate device in response to not receiving the confirmation from the user that the determined most likely candidate device is the requested device.

2. The method of claim 1, further comprising receiving, by the personal assistant device, an instruction from the user that the determined most likely candidate device is not the requested device.

3. The method of claim 2, further comprising, in response to receiving the instruction from the user that the determined most likely candidate device is not the requested device, determining a second most likely candidate device from the list of candidate devices, to activate in response to the request.

4. The method of claim 1, further comprising advising the user, by the personal assistant device, that the requested device is not on the list based on a determination that all of the candidate devices have been tried to activate the requested device.

5. The method of claim 1, further comprising advising the user, by the personal assistant device, that the requested name has been saved as a confirmed name for the determined most likely candidate device on the list.

6. The method of claim 1, wherein the determining of a most likely candidate device is based on a location context of the user's request relative to the candidate devices on the list.

7. The method of claim 1, wherein the determining of a most likely candidate device is based on device types of the candidate devices on the list.

8. The method of claim 1, wherein the determining of a most likely candidate device is based on a location of the user relative to multiple candidate devices on the list.

9. The method of claim 1, wherein the determining of a most likely candidate device is based on data regarding candidate devices within a requested area that have not yet been named by the personal assistant device.

10. The method of claim 1, wherein the determining of a most likely candidate device is based on a collective opinion of a group of individuals determined from cognitive analysis regarding the candidate devices on the list.

11. The method of claim 10, further comprising providing, by the personal assistant device, a verbal response to the user that the name has been stored, wherein:
  the personal assistance device confirms that a correct device has been activated by receiving confirmation from the user that the correct device has been activated, and
  the collective opinion of the group represents aggregated answers to questions involving quantity estimation, world knowledge, and spatial reasoning.

12. The method of claim 1, wherein the personal assistance device confirms that the correct device has been activated based on not receiving instructions from the user within a predetermined period of time after the personal assistant device attempts to activate the device.

13. The method of claim 1, wherein:
the personal assistant device is wirelessly connected to the candidate devices;
the determining of the most likely candidate is based on cognitive analysis of data regarding the candidate devices on the list;
the personal assistant device is coupled to a cloud computing environment; and
the determining of candidate devices on the list is performed in the cloud computing environment.

14. A system comprising:
a processor, a computer readable memory, and a computer readable storage medium located in a personal assistant device;
program instructions to receive a request from a user, by a personal assistant device, to activate a requested device which the user has identified with a requested name which is unrecognized by the personal assistant device;
program instructions to determine, by the personal assistant device, a most likely candidate device from a list of candidate devices to activate in response to the request;
program instructions to activate, by the personal assistant device, the determined most likely candidate device;
program instructions to determine, by the personal assistant device, a next most likely candidate device from the list of candidate devices to activate in response to the request, in response to receiving an indication from the user that the determined most likely candidate device on the list is not the requested device;
program instructions to deactivate, by the personal assistant device, the determined most likely candidate device in response to receiving the indication from the user that the determined most likely candidate device on the list is not the requested device;
program instructions to activate, by the personal assistant device, the determined next most likely candidate device;
program instructions to receive confirmation from the user that the determined next most likely candidate device is the requested device; and
program instructions to identify and save, by the personal assistant device, the requested name as the name of the next most likely candidate device in response to receiving confirmation from the user that the determined next most likely candidate device is the requested device.

15. The system of claim 14, further comprising program instructions to advise the user, by the personal assistant device, that the requested device is not on the list based on a determination that all candidate devices have been tried to activate the requested device.

16. The system of claim 14, further comprising program instructions to advise the user, by the personal assistant device, that the requested name has been saved as a confirmed name for the determined most likely candidate device on the list, wherein:
the personal assistant device is wirelessly connected to the candidate devices;
the determining of the most likely candidate and the next most likely candidate is based on cognitive analysis of data regarding the candidate devices on the list.

17. The system of claim 14, wherein the data regarding the candidate devices on the list includes a location context of the user's request relative to the candidate devices on the list.

18. The system of claim 14, wherein the personal assistance device confirms that the correct device has been activated by at least one of the group consisting of: receiving confirmation from the user that the correct device has been activated; and not receiving instructions from the user within a predetermined period of time after the personal assistant device attempts to activate the device.

19. A computer program product, the computer program product comprising a computer readable storage medium having program instructions embodied therewith, the program instructions executable by a personal assistant device to cause the personal assistant device to:
receive a request from a user to activate a requested device which the user has identified with a requested name which is unrecognized by the personal assistant device;
in response to the unrecognized requested name, store the unrecognized requested name in a form of an unmapped sensor;
determine a most likely candidate device from a list of candidate devices to activate in response to the request;
activate the determined most likely candidate device;
receive confirmation from the user that the determined most likely candidate device is the requested device, wherein the confirmation is not receiving any information from the user within a predetermined time period following activation of the determined device; and
identify and save the requested name as the name of the most likely candidate device in response to receiving confirmation from the user that the determined most likely candidate device is the requested device.

20. The computer program product of claim 19, further comprising program instructions to advise the user, by the personal assistant device, that the requested device is not on the list based on a determination that all candidate devices have been tried to activate the requested device.

* * * * *